United States Patent
Mashimo (10) Patent No.: US 8,272,697 B2
(45) Date of Patent: Sep. 25, 2012

(54) INWARD HANGING METHOD AND VEHICLE SEAT

(75) Inventor: Tomoyuki Mashimo, Tochigi (JP)

(73) Assignee: TS Tech Co., Ltd, Saitama (JP)

(*) Notice: Subject to any disclaimer, the term of this patent is extended or adjusted under 35 U.S.C. 154(b) by 332 days.

(21) Appl. No.: 12/669,592

(22) PCT Filed: Jul. 17, 2008

(86) PCT No.: PCT/JP2008/062915
§ 371 (c)(1),
(2), (4) Date: Jan. 19, 2010

(87) PCT Pub. No.: WO2009/011386
PCT Pub. Date: Jan. 22, 2009

(65) Prior Publication Data
US 2010/0181818 A1    Jul. 22, 2010

(30) Foreign Application Priority Data
Jul. 19, 2007    (JP) ................................ 2007-188891

(51) Int. Cl.
*A47C 7/24* (2006.01)
*B60N 2/58* (2006.01)
*B68G 7/00* (2006.01)

(52) U.S. Cl. .................. 297/452.62; 297/452.6; 29/91.1

(58) Field of Classification Search ............... 297/218.1, 297/218.5, 218.3, 219.1, 452.62, 452.6; 29/91.1; 112/475.01
See application file for complete search history.

(56) References Cited

U.S. PATENT DOCUMENTS

| | | | | |
|---|---|---|---|---|
| 1,857,418 A | * | 5/1932 | Wedler | 297/219.1 |
| 3,630,572 A | * | 12/1971 | Homier | 297/452.6 |
| 3,971,112 A | * | 7/1976 | Amato et al. | 29/91.1 |
| 5,501,165 A | * | 3/1996 | Nagashima | 112/475.06 |
| 7,823,980 B2 | * | 11/2010 | Niwa et al. | 297/452.61 |

FOREIGN PATENT DOCUMENTS

| | | |
|---|---|---|
| JP | 6371799 | 5/1988 |
| JP | 6312068 | 11/1994 |
| JP | 2006095093 | 4/2006 |

* cited by examiner

*Primary Examiner* — Milton Nelson, Jr.
(74) *Attorney, Agent, or Firm* — Schiff Hardin LLP (57) ABSTRACT

A trim cover is inwardly hung into inward hanging grooves of a vehicle seat. The vehicle seat includes a cushion pad having right and left bank faces. A number of workpieces are cut out. Portions of the cut out workpieces are gathered. There portions correspond to lateral inward hanging ends located at lateral end portions of inward hanging margins of the cut out workpieces. The gathered portions are sewn so as to curve, into inward hanging directions, the inward hanging margin portions of the workpieces thereby contracting obverse surface materials of the workpieces. Inward hanging members are mounted to the trim cover. the inward hanging members are inserted into longitudinal inward hanging grooves. Fasteners engage the inward hanging members and engagement members of the cushion pad.

6 Claims, 8 Drawing Sheets

Fig. 8 ns, and the like on a pattern paper for cutting out workpieces for the outer cover materials at the time of fabrication of the pattern paper, so as to enable sewing and to avoid occurrence of deflections of the outer covers at inward hanging ends thereof.

INWARD HANGING METHOD AND VEHICLE SEAT

TECHNICAL FIELD

The present disclosure relates to an inward hanging method and a vehicle seat, and particularly to: an inward hanging method for a trim cover to be used for a vehicle seat provided with bank faces; and a vehicle seat.

BACKGROUND ART

Figure 7:
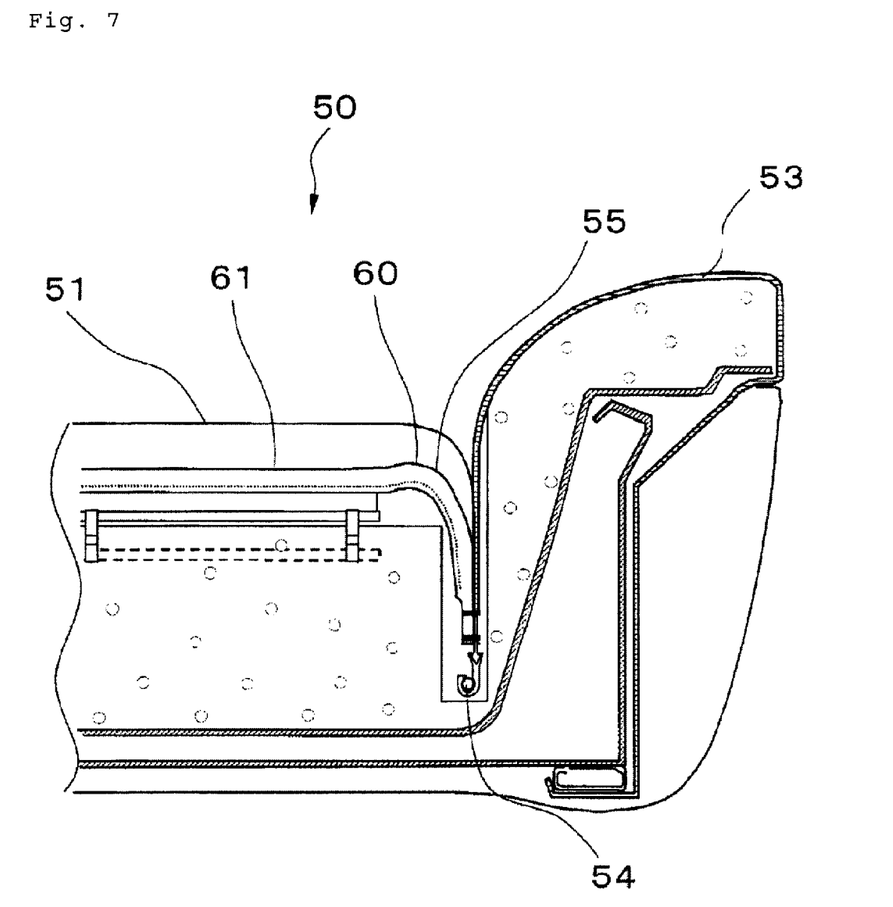
FIG. 7 is a partially cross-sectioned explanatory view of a seat according to a conventional example.
Figure 8:
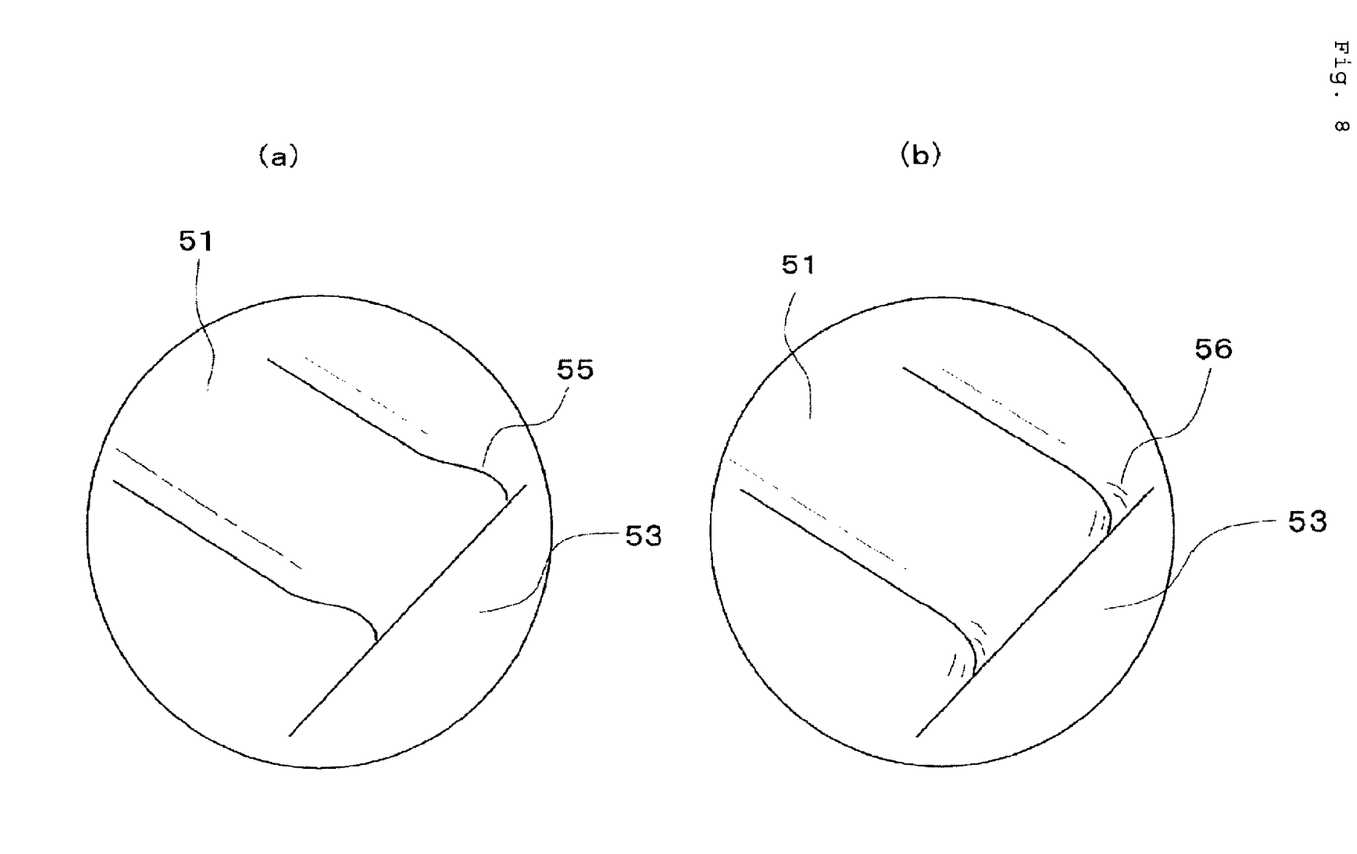
FIG. 8 is a schematic view of inward hanging ends of the conventional example viewed from an obverse surface side.

Trim covers of a vehicle seat are each constituted of multiple outer cover materials joined to one another. Further, so as to prevent floating of a seat outer cover and to improve design characteristics, inward hanging is conducted along edge portions of the outer cover materials constituting the trim covers of the seat. FIG. 7 and FIG. 8 show a conventional example, where FIG. 7 is a partial cross-sectional view of a transitional area between a seating face 51 and a bank face 53, and FIGS. 8(a) and 8(b) are schematic views of lateral inward hanging ends 60 viewed from an obverse surface side. In case of adoption of multiple outer cover materials, inward hanging is to be conducted along stitching edges (sewing edges) of the outer covers, in such a manner shown in FIG. 7 to embed an insert wire 54 into a cushion material, and to engage inward hanging cords attached to sewing edge portions of the outer cover materials with the insert wire by clips, C-rings, or the like.

Further, it is typical to contemplate further improving an external appearance quality, by combiningly using: longitudinal inward hanging to be conducted between the seating face 51 and the bank face 53; and lateral inward hanging to be conducted for the seating face 51, in a direction orthogonal to the bank face 53; (see Patent Document 1, for example, cited below).

However, as shown in FIG. 7, each lateral inward hanging end 60 which corresponds to a longitudinal/lateral inward hanging intersection, and a lower end (not shown) of the bank which is located at an end of the longitudinal inward hanging, are sites where inward hanging is terminated, so that outer cover excesses are likely to be caused there, such as due to partially lowered tensions of pulling in, and a failure of compliance of outer covers with three-dimensional shapes at the inward hanging ends, respectively.

Namely, as shown in the schematic views of the lateral inward hanging ends 60 viewed from the obverse surface side thereof in FIGS. 8(a) and 8(b), the outer cover excesses caused at the lateral inward hanging ends 60 bring about deteriorated external appearance qualities at the inward hanging ends, such as deflections 55, creases 56, and the like of the outer covers.

Inherently, to avoid outer cover excesses, it is required to conduct inward hanging in a manner that the edges of the outer covers to be sewn together have the same lengths as the edges themselves such that the outer covers are pulled in by the inward hanging. However, it is then very likely that a sewing operation is not allowed in case of trim covers for which a pulled-in feeling of inward hanging is demanded, because the sewing margins of those portions corresponding to the longitudinal/lateral inward hanging intersections become complicated three-dimensional shapes then, respectively. Further, inward hanging lines at the trim cover side are then disadvantageously deflected, upon mounting thereof onto a cushion material.

As such, it has been conventionally contemplated to adjust the shapes of the inward hanging margins, the sewing mar- However, even in case of such contemplation, edges of the outer covers to be sewn together are always configured to have lengths longer than those of the edges themselves such that the outer covers are pulled in by the inward hanging. Thus, such an insufficiency of balance brings about occurrence of the deflections 55 of the inward hanging lines, the creases 56, and the like.

Patent Document 1: Japanese Unexamined Patent Application Publication No. 2006-95093.

DISCLOSURE OF INVENTION

Problem to be Solved by the Invention

To solve the aforementioned problems, there has been investigated a deep-inward hanging technique for pulling creases, which tend to be caused at the stitching edges of the inward hanging intersections, into the bottoms of the inward hanging grooves. This technique is configured to extend the inward hanging margins of the outer cover materials so as to allow for deep-inward hanging to the limits of the thicknesses of the cushion materials (cushion pads), so that the stitching edges, and the creases to be caused at the stitching edges are buried into the inward hanging grooves, respectively.

In case of the aforementioned inward hanging structure, it is possible to bury the creases into the groove bottoms without problems, in those regions where stresses only in the longitudinal inward hanging direction are applied. However, even in the case of the inward hanging structure according to this technique, it is inevitable at the longitudinal/lateral inward hanging intersections that the edges of the outer covers to be sewn together are configured to have lengths longer than those of the edges themselves such that the outer covers are pulled in by the inward hanging, resulting in that creases are easily caused. In case of the occurrence of larger creases, they are likely to reach the upper portions of the inward hanging grooves such that parts of the creases are possibly exposed up to an obverse side of a seating face.

Since deflections/creases of the outer cover materials are caused by excesses of the outer cover materials, it is required to stretch the excesses of the outer covers by pulling them to forcibly apply stresses to them. However, there is a possibility to induce creases due to the pulling while eliminating the outer cover excesses, such as by adjusting the shapes of the outer cover materials before sewing to thereby change the stresses of pulling, i.e., such as by changing the pulling distances based on a pattern paper for cutting out outer cover materials. Thus, it is required to eliminate the outer cover excesses, by another technique.

Further, it is also problematic that differences of physical properties such as an elongation percentage among the outer cover materials to be used will result in different degrees of deflections, creases, and the like, such that differences are likely to be caused in the external appearance quality depending on the kinds of the outer cover materials to be used. In this way, it is difficult to integrally control the qualities, because of the variances depending on the kinds of the outer cover materials, thereby bringing about deteriorated external appearance capabilities as products.

As such, it is required to correct deflections, creases, and the like caused by the outer cover excesses in the above-described inward hanging so as to fix external product appearance capabilities, qualities, and the like of vehicle seats such that a correcting step is separately required, which thereby problematically necessitates a larger cost.

It is therefore an object of the present invention to provide: an inward hanging method capable of keeping a preferable external appearance of an inward hanging end in the inward hanging of a trim cover to be used for a vehicle seat having bank faces; and a vehicle seat. It is another object of the present invention to provide: an inward hanging method capable of producing a vehicle seat having bank faces of a stable quality without creases in the inward hanging, without requiring any corrections in a post-process, while allowing the vehicle seat to possess a preferable external appearance; and a vehicle seat.

Means for Solving Problem

The above problems are solved by an inward hanging method for a trim cover of a vehicle seat including a cushion pad having a central part and bank faces developed rightwardly and leftwardly of the central part, the method being configured to inwardly hang the trim cover along boundaries between the central part and the bank faces of the cushion pad, respectively, the method comprising: cutting out multiple workpieces to be formed into the trim cover; applying gathers to portions of the cut out workpieces, the gathered portions corresponding to lateral inward hanging ends located at lateral end portions of inward hanging margins of the cut out workpieces; sewing up the gathered portions of the cut out workpieces in a manner to curve, into inward hanging directions, the inward hanging margin portions of the workpieces subjected to the gathering by contraction of obverse surface materials of the workpieces by virtue of the gathering, to thereby form the trim cover; mounting inward hanging members to sewing edges of the trim cover; and performing inward hanging by covering the sewn trim cover into longitudinal inward hanging grooves formed along boundaries between the central part and the bank faces of the cushion pad, and by engagingly attaching engagement fasteners into and/or between (i) the inward hanging members mounted to the sewing edges of the trim cover and (ii) engagement members formed at the cushion pad side or at a frame side on which the cushion pad is placed, to thereby inwardly hang the trim cover.

In this way, the gathering is conducted to apply gathers to those portions of the workpieces, which portions correspond to lateral inward hanging ends located at lateral end portions of inward hanging margins of the workpieces. Thus, obverse surface materials at the inward hanging margin portions of the workpieces are contracted and curved into the inward hanging directions, and the thus curved workpieces are sewn up to form the trim cover which is then inwardly hanged, thereby enabling an inward hanging method capable of keeping a preferable external appearance of the inward hanging ends without creases.

The central part of the cushion pad may be formed with those inward hanging grooves for lateral inward hanging in the lateral direction, which are intersected with the longitudinal inward hanging grooves and connected to the longitudinal inward hanging grooves; also, the inward hanging into the inward hanging grooves for lateral inward hanging may be conducted by engagingly attaching engagement fasteners into and/or between engagement members formed at the cushion pad side or at the frame side on which the cushion pad is placed. In this way, simultaneously conducting the lateral inward hanging and the longitudinal inward hanging allows for obtainment of a better external product appearance capability.

A gathering length applied to the sewing portion of each pertinent workpiece may be made to be the same as a gathering length applied to a mated stitching portion of another workpiece which is to be stitched to the pertinent workpiece. In this way, the gathering lengths of the mated workpieces to be stitched to each other are made to be the same, thereby providing an inward hanging method capable of conducting the production without creases and with a stable quality and providing a preferable external appearance without requiring any corrections in a post-process.

The above problems are also solved by a vehicle seat produced by an inward hanging method for a trim cover of the vehicle seat including a cushion pad having a central part and bank faces developed rightwardly and leftwardly of the central part, the method being configured to inwardly hang the trim cover along boundaries between the central part and the bank faces of the cushion pad, respectively, the method comprising: cutting out multiple workpieces to be formed into the trim cover; applying gathers to portions of the cut out workpieces, the gathered portions corresponding to lateral inward hanging ends located at lateral end portions of inward hanging margins themselves of the cut out workpieces for lateral inward hanging; sewing up the cut out workpieces subjected to the gathering, in a manner to curve, into inward hanging directions, the inward hanging margin portions of the workpieces subjected to the gathering by contraction of obverse surface materials of the workpieces by virtue of the gathering, to thereby form the trim cover; mounting inward hanging members to sewing edges of the trim cover; and performing inward hanging by covering the sewn trim cover into longitudinal inward hanging grooves formed along boundaries between the central part and the bank faces of the cushion pad, and by engagingly attaching engagement fasteners into and/ or between (i) the inward hanging members mounted to the sewing edges of the trim cover and (ii) engagement members formed at the cushion pad side or at a frame side on which the cushion pad is placed, to thereby inwardly hang the trim cover. In this way, the vehicle seat produced by the above described inward hanging method can be produced with a stable quality without creases at the inward hanging ends and with a preferable external appearance, in a manner to possess a preferable external appearance without requiring any corrections in a post-process.

Effect of the Invention

According to the inward hanging method and the vehicle seat of the present invention, the sewing portions of the outer cover materials are subjected to the gathering, thereby enabling to restrict occurrence of outer cover excesses which have been otherwise caused at inward hanging ends, particularly at lateral inward hanging ends, in a manner to prevent occurrence of deflections, creases, and the like of the outer covers, thereby obtaining a seat having a preferable external appearance. Further, even when the nature of the outer cover material is changed, it is also possible to compensate for differences of physical properties such as an elongation percentage, by adjusting a contraction-applied length or contraction ratio of the gathered portion. This eliminates variances in external appearance having been conventionally caused upon change of outer cover materials, thereby obtaining stable external appearance qualities. Moreover, the present invention resides in the simple configuration to apply the gathering to sewing portions of outer cover materials, thereby enabling to provide the inward hanging method and to produce the vehicle seat without requiring provision of any specific equipments and the like.

EXPLANATIONS OF LETTERS OR NUMERALS

S, 50 vehicle seat
S1 seat cushion
S2 seat-back
1 central part of seat cushion
3, 53 bank face
4a, 4b trim cover
5 workpiece
6 outer cover material
6a obverse surface material
6b wadding material
6c lining material
7 seat frame
7a pan frame
7b leg portion
11, 12, 13 workpiece (after gathering)
12a workpiece (before gathering)
17 gathered portion
19 sewing thread
20, 60 lateral inward hanging end
21, 61 lateral inward hanging area
22 inward hanging margin
23 sewing margin
30 cushion pad
31 longitudinal inward hanging groove
32 lateral inward hanging groove
33 inward hanging cord
33a web fabric
33b beaded stripe
34 clip
35, 54 insert wire
51 seating face
55 deflection of outer cover at inward hanging end of conventional example
56 crease of outer cover at inward hanging end of conventional example

BEST MODE(S) FOR CARRYING OUT THE INVENTION

Figure 1:
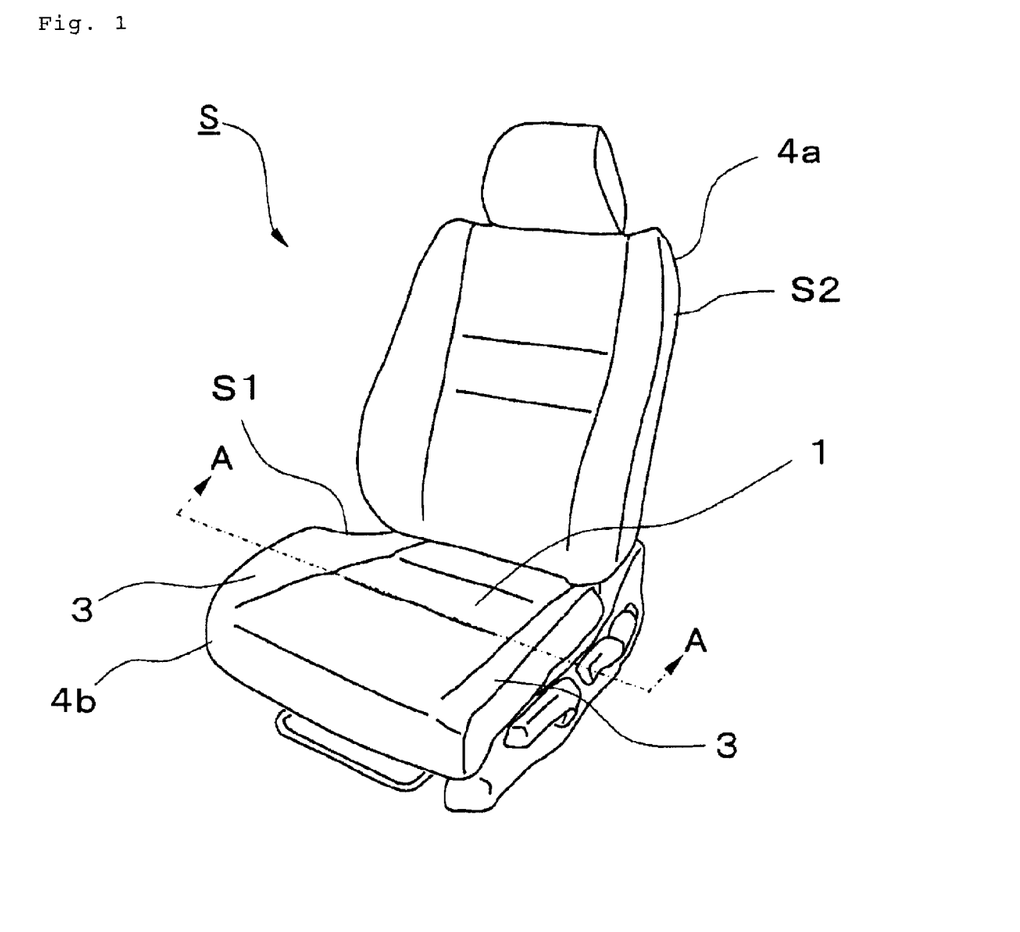
FIG. 1 is a schematic perspective view of a vehicle seat according to the present invention.
Figure 2:
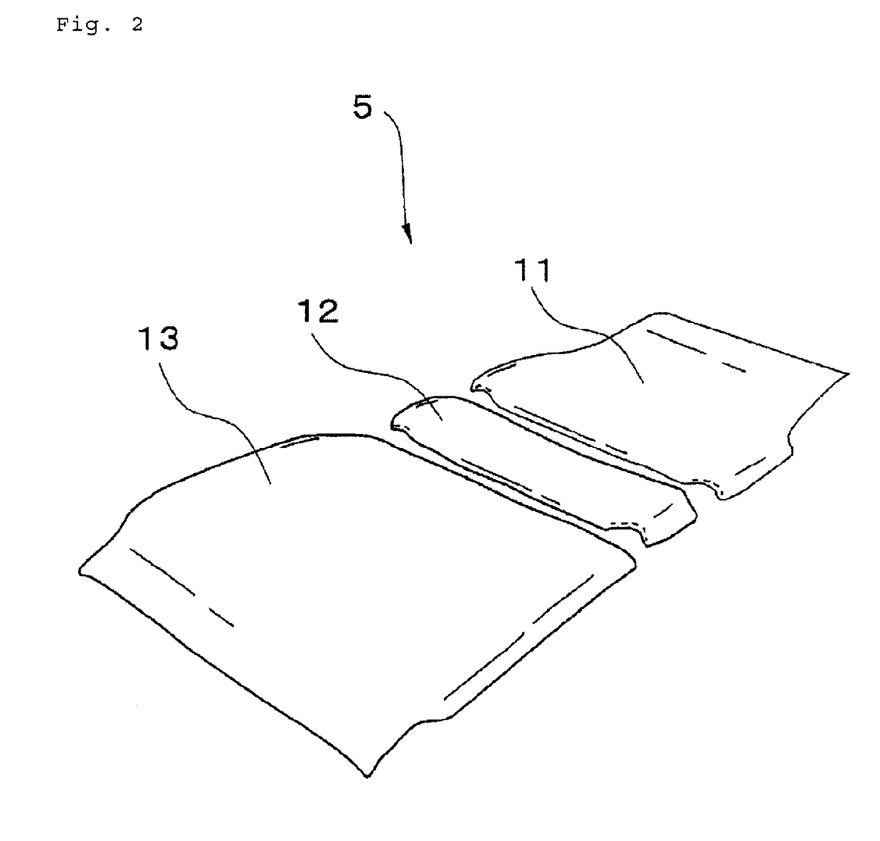
FIG. 2 is an explanatory view of a trim cover according to an embodiment of the present invention.
Figure 3:
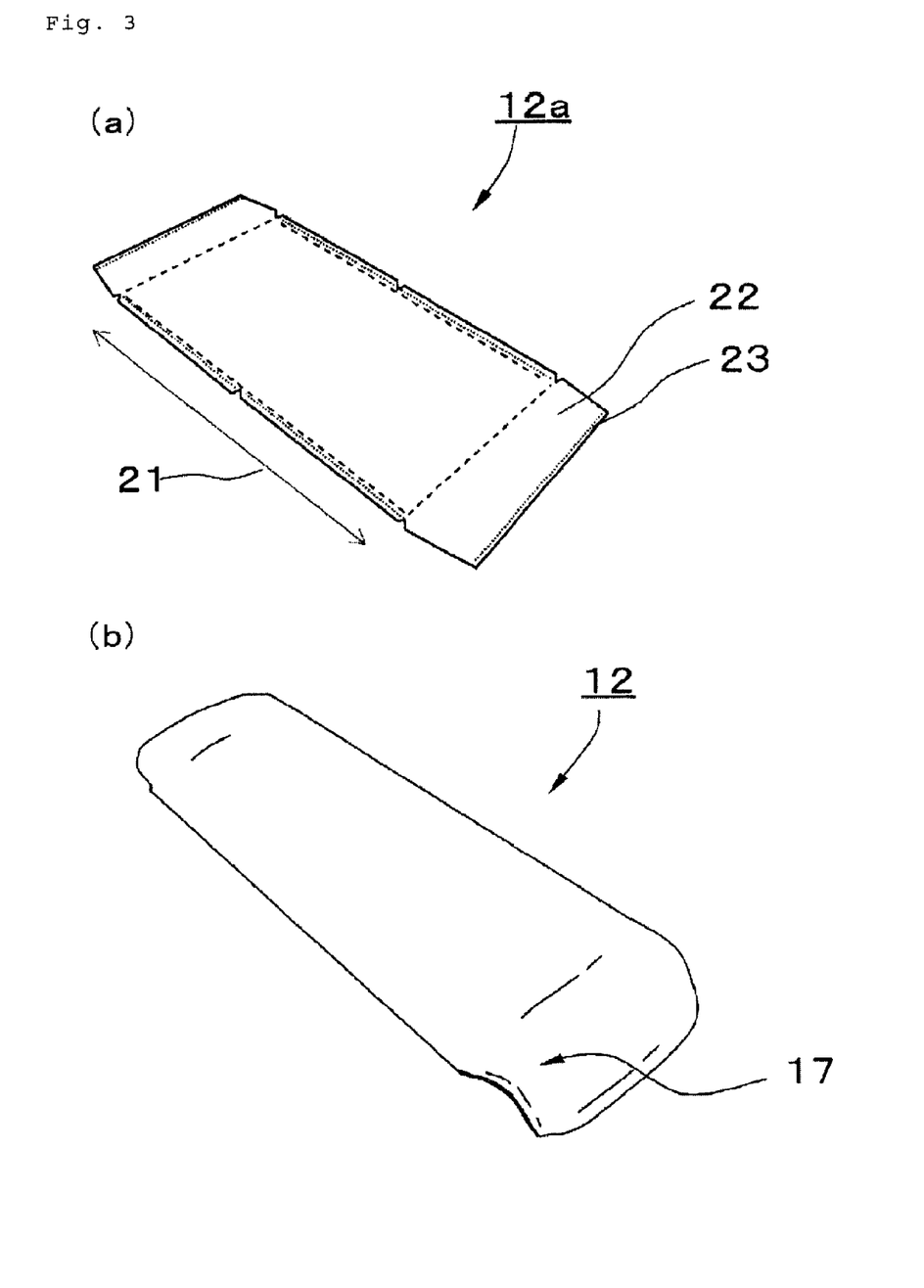
FIG. 3 is an explanatory view of an example of a workpiece.
Figure 4:
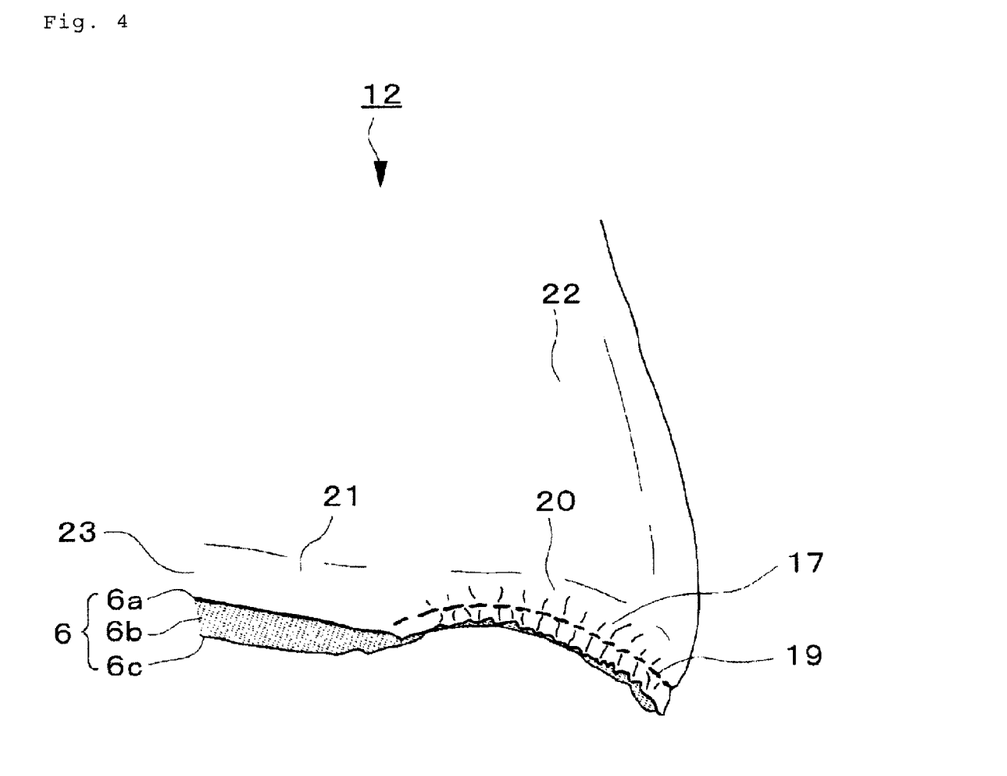
FIG. 4 is an enlarged explanatory view of a gathered portion of the workpiece.
Figure 5:
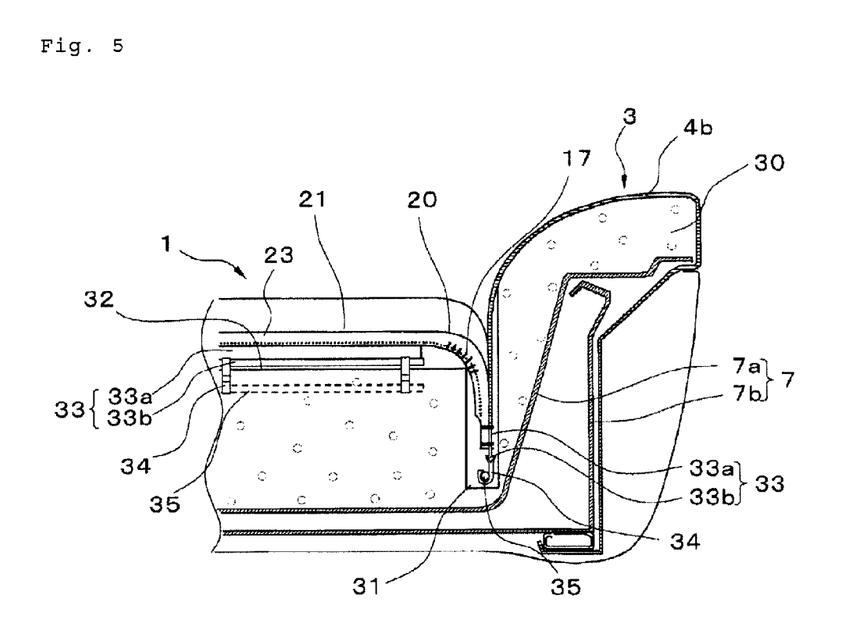
FIG. 5 is a partially cross-sectioned explanatory view along a line A-A of FIG. 1.
Figure 6:
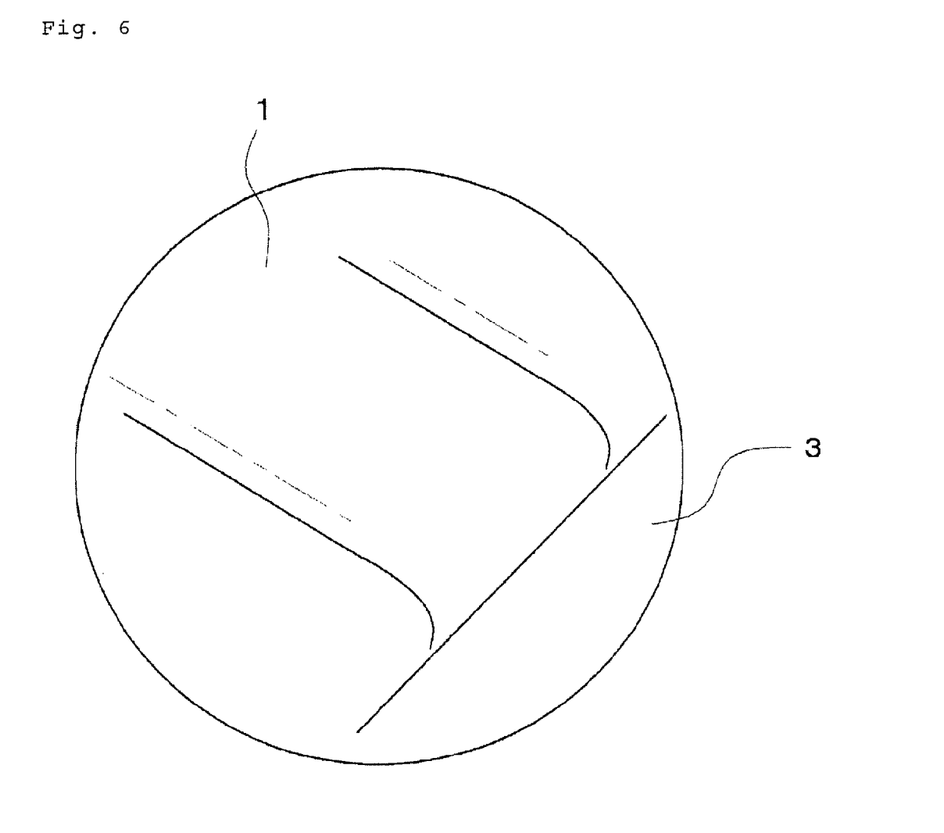
FIG. 6 is a partial explanatory view of inward hanging ends according to the present invention.

Embodiments of the present invention will be described hereinafter with reference to the drawings. The members, arrangements, and the like to be described hereinafter are not intended to restrict the present invention, and can be of course variously modified without departing from the spirit or scope of the present invention. FIG. 1 to FIG. 6 show an embodiment according to the present invention, where FIG. 1 is a schematic perspective view of a vehicle seat, FIG. 2 is an explanatory view of a trim cover, FIG. 3 is an explanatory view of an example of a workpiece, FIG. 4 is an enlarged explanatory view of a gathered portion of the workpiece, FIG. 5 is a partially cross-sectioned explanatory view along a line A-A of FIG. 1, and FIG. 6 is a partial explanatory view of inward hanging ends.

As shown in FIG. 1, the vehicle seat S according to this embodiment is constituted of a seat cushion S1 and a seat-back S2. The seat cushion S1, to which this embodiment is applied, will be explained by way of example, for inward hanging of the vehicle seat S. The seat cushion S1 as a seating portion constituting the vehicle seat S comprises: a central part 1 of the seat cushion; bank faces 3 developed rightwardly and leftwardly of the central part 1 of this seat cushion; and a seat frame 7 as a frame for placing a cushion pad 30 thereon; and the cushion pad 30 is placed on the seat frame 7, and is covered with a trim cover 4b.

The seat frame 7 of this embodiment is formed of a metal or hard resin having a rigidity, and is constituted of a pan frame 7a for supporting the cushion pad 30 from the bottom thereof, and a leg portion 7b acting as a support base. Further, the leg portion 7b has a configuration for allowing inner rails (not shown) to be attached thereto, which can be combined with outer rails installed on a vehicular body floor and can be assembled in a sliding manner to allow for positional adjustment in a fore-and-aft direction.

The cushion pad 30 of this embodiment is formed of a foamed soft resin having an elasticity. The cushion pad 30 is formed with: longitudinal inward hanging grooves 31 for longitudinal inward hanging along boundaries between the central part 1 of the seat cushion and the bank faces 3 thereof, respectively; and lateral inward hanging grooves 32 for the lateral inward hanging, also at the central part 1 of the seat cushion. The longitudinal inward hanging grooves 31 are formed to be directed from an upper edge of an area corresponding to the central part 1 of the seat cushion, up to a lower edge of the area, while the lateral inward hanging grooves 32 are formed in a lateral direction as additional inward hanging grooves which intersect with the longitudinal inward hanging grooves 31 and which are connected thereto, respectively.

The bank faces 3 of this embodiment have shapes raised to be higher than the central part 1 of the seat cushion in a manner to support right and left sides of a seating person, thereby exhibiting an effect to enhance a seating feeling. Further, the trim cover 4b of this embodiment is formed by sewing multiple outer cover materials 6 together, in a manner to conceal the seat frame 7, the cushion pad 30, and the like, thereby obtaining a preferable external appearance and design.

Here, the workpieces 5 constituting the trim cover 4b of this embodiment will be explained for a fabricating procedure, based on FIG. 2 through FIG. 4. As shown in FIG. 2, the trim cover 4b of this embodiment comprises three workpieces 5 (the three workpieces are referenced to as 11, 12, and 13, respectively) for covering the central part 1 of the seat cushion.

The workpieces 5 (11, 12, and 13) of this embodiment are each established in a manner that: an outer cover material 6 having a three-layer structure comprising an obverse surface material 6a, a wadding material 6b, and a lining material 6c, is cut into a predetermined shape taking account of areas corresponding to sewing margins 23 and inward hanging margins 22, followed by gathering along predetermined end side locations of the outer cover material, at each bank face 3 side, respectively.

FIG. 3 shows one 12 of the workpieces 5 (11, 12, and 13) shown in FIG. 2 by way of example, after cutting and after subsequent gathering, where FIG. 3(a) is an explanatory view of a workpiece 12a after cutting (before gathering), and FIG. 3(b) is an explanatory view of the workpiece 12 after gathering. The workpiece 12 (12a) will be explained based on FIG. 3.

Firstly conducted is a cutting step for cutting out multiple workpieces to be formed into the trim cover 4b. Used for cutting out the workpiece 12a is a pattern paper which has been previously cut out into a predetermined shape. Using the pattern paper enables the workpiece 12a to obtain stabler dimensions. The workpiece 12a has been cut into a shape having an area corresponding to the inward hanging margin 22 at least one of opposite edges. Further, the workpiece has sewing margins 23 each along a sewing portion such as an edge of the applicable inward hanging margin 22.

Next, FIG. 4 is the enlarged explanatory view of a gathered portion of the workpiece 12, and gathering is conducted as shown in FIG. 4 in a manner to apply a gather to a portion corresponding to each lateral inward hanging end 20 located at each lateral end portion of the applicable inward hanging margin 22 itself for lateral inward hanging of the workpiece 12a having been cut out in the cutting step. Namely, gathering is applied to those areas of each inward hanging margin 22, which areas are arranged at the associated lateral inward hanging ends 20 of the workpiece 12a after cutting, respectively. This gathering is applied to only those portions of each inward hanging margin 22 of the workpiece 12, which portions correspond to the positions of the associated lateral inward hanging ends 20, respectively. The gathering of this embodiment is conducted by using a sewing machine having a gathering function. In this way, gathering is applied to the positions corresponding to the lateral inward hanging ends 20, respectively, thereby bringing about a state wherein the area of each inward hanging margin 22 for lateral inward hanging is curved.

To be subsequently conducted is a sewing step configured to: curve each inward hanging margin 22 of the workpiece 12 having been subjected to gathering, into an inward hanging direction by contraction of the obverse surface material 6a by virtue of the gathering; and sew up the workpiece 12 having been subjected to the gathering by use of sewing threads 19 to form the trim cover. Here, each gathering length applied to the sewing portion of the workpiece 12 has the same length as a gathering length applied to a mated stitching portion of another workpiece (such as workpiece 13) which is to be stitched to the workpiece 12. The cooperating gathering lengths are thus made into the same length, thereby balancing the tensions to be applied to the mated lateral inward hanging ends 20 to more effectively restrict occurrence of outer cover excesses.

Although this embodiment has been exemplified based on the example where gathering is conducted in a separate step, it is also possible to apply the gathering simultaneously with the sewing, by duly modifying the setting of a sewing machine at the gathering target portions upon sewing of the neighboring workpieces (such as workpieces 12 and 13).

Other workpieces are also sewn up, after application of gathering to pertinent locations thereof. The sewing type is arbitrarily selected from among single stitch, double stitch, and the like, depending on the type of the obverse surface material.

Each inward hanging margin 22 of the workpiece 12 is curved into the inward hanging direction, by contraction by virtue of the gathering. Thus, also in the case that the gathered portions 17 of the multiple workpieces 5 (11, 12, and 13) constituting the central part 1 of the seat cushion are stitched to one another, those sewing portions corresponding to the lateral inward hanging ends 20 as sewing portions are curved into the inward hanging directions, respectively.

Upon sewing up the workpieces corresponding to the bank faces 3, these workpieces are stitched to the gathered ones, respectively, in a state that those sewing edges curved by the gather sewn portions of the gathered workpieces are brought back to straight configurations relative to the sewing margins 23 of the bank faces 3, respectively.

According to the above described steps, the contracted inward hanging margins (sewing edges) 22 can be formed at those locations corresponding to the lateral inward hanging ends 20 of the trim cover 4b, respectively.

Subsequently conducted is an inward hanging cord mounting step for mounting inward hanging cords 33 as inward hanging members to sewing edges of the trim cover 4b formed by the sewing step, respectively. Mounted to the trim cover 4b by this inward hanging cord mounting step are the inward hanging cords 33 to be inwardly hanged and fixedly attached upon mounting the trim cover into the seat cushion S1. These inward hanging cords 33 are provided by incorporatingly sewing them along (i) edge stitching portions (sewing edges) corresponding to longitudinal inward hanging positions, between the central part 1 and the bank faces 3 of the seat cushion and (ii) edge stitching portions (sewing edges) corresponding to lateral inward hanging positions, between the workpieces themselves of the central part 1 of the seat cushion.

The mounted inward hanging cords 33 each have a configuration comprising a web fabric 33a and a beaded stripe 33b sewn onto the web fabric along a longitudinal edge thereof. It is enough for each inward hanging cord 33 to have a cross-sectional shape such as a rectangular, circular, or inverted triangular shape which is thicker than the web fabric 33a, while the web fabric 33a can be formed of a fabric material such as a nonwoven fabric.

Since the sewing operation of the trim cover 4b is conducted in a state that its reverse surface side is directed outwardly, for reason of convenience in the operation, the trim cover is reversed to direct the obverse surface thereof outwardly after completion of the sewing procedure. In this way, the trim cover 4b having the three-dimensional shape is completed.

Subsequently conducted is an inward hanging step configured to: cover the trim cover 4b formed in the sewing step, into the longitudinal inward hanging grooves 31 for longitudinal inward hanging formed along boundaries between the central part 1 and bank faces 3 of the cushion pad, respectively; and engagingly attach clips 34 as engagement fasteners into and/or between (i) the inward hanging cords 33 mounted on the sewing edges of the trim cover 4b, and (ii) insert wires 35 as engagement members exposed from the cushion pad 30, respectively. Namely, the completed trim cover 4b is mounted onto the cushion pad 30. Shown in FIG. 5 is a partially cross-sectioned explanatory view of the mounted trim cover 4b of this embodiment, along a line A-A of FIG. 1.

Upon mounting of the completed trim cover 4b onto the cushion pad 30, those contracted inward hanging margins 22 having been formed by mutually stitching the gathered portions 17 are disposed at positions of the inward hanging grooves correspondingly to the lateral inward hanging ends 20 of the cushion pad 30, respectively.

The cushion pad 30 is formed with, in the lateral direction and at its central part, the lateral inward hanging grooves 32 for lateral inward hanging which are intersected with and connected to the longitudinal inward hanging grooves 31; and the insert wires 35 are mounted on bottoms of both of the longitudinal/lateral inward hanging grooves 31, 32 formed for conducting the longitudinal/lateral inward hanging, respectively, such that the insert wires 35 are integrally formed with the cushion pad 30 upon molding of the cushion pad 30 in a manner to expose those portions of the insert wires with which the clips 34 for inward hanging are engaged. The mounted trim cover 4b is inwardly hanged by engagingly attaching clips 34 into and/or between (i) the beaded stripes 33b of the inward hanging cords 33 mounted on the sewing edges of the trim cover 4b, and (ii) the insert wires 35 exposed from the cushion pad 30, respectively.

FIG. 6 is a partial explanatory view of the lateral inward hanging ends 20 according to this embodiment. According to this embodiment, gathering is applied to sewing portions corresponding to the lateral inward hanging ends 20 so as to contract the outer cover materials 6 of the sewing portions in a manner to form the inward hanging margins 22 having ideal shapes which are free of occurrence of excesses and shortages of outer covers, thereby effectively eliminating outer cover excesses at inward hanging ends, to realize an excellent external appearance quality.

Since actual lengths of the sewing margins 23 can be contracted by virtue of the gathering in this embodiment, it becomes possible to prevent the occurrence of creases due to excesses of the outer cover materials 6, and to promote fitting to the R shapes of the mating members to thereby reproduce natural R shapes. In this respect, since creases to be caused by the gathering itself are quite small, they are accommodated into the sewing margins 23 or pulling-in margins and are thus never exposed into the external appearance.

Further, the contraction amounts of the sewing portions having been subjected to the gathering and corresponding to the lateral inward hanging ends 20 can be adjusted upon gathering. Thus, it becomes possible to restrict occurrence of outer cover excesses at longitudinal/lateral inward hanging intersections to thereby embody inward hanging intersections which are free of creases by adjusting the contraction amounts in a manner to adapt them to pulling-in margins calculated to be required for the lateral inward hanging ends 20 upon establishing the trim cover 4b as an assembly.

In case of the workpiece 12 according to this embodiment by way of an example, the actual length of each stitching edge corresponding to the lateral inward hanging end 20 is contracted from 55 mm to 45 mm by virtue of gathering, to thereby set a contraction ratio of 18% therefor.

Further, even when the nature of the outer cover material 6 is changed, it is also possible to compensate for differences of physical properties such as an elongation percentage of the outer cover material 6 by adjusting a contraction-applied length or contraction ratio of the gathered portion. This eliminates variances in external appearance having been conventionally caused upon change of outer cover materials 6, thereby obtaining stable external appearance qualities.

Note that although the above embodiment has been explained for the trim cover 4b for covering the seat cushion S1 of a front seat of a vehicle as a specific example, the present invention is not limited thereto, and it is of course possible to also exemplarily apply the same configuration to a trim cover of the seat-back S2, or to trim covers of a seat cushion and a seat-back of a rear seat. Further, without limited to trim covers for vehicles, it is of course possible to also apply the same configuration to sofas, chair covers, and the like.

The invention claimed is:

1. An inward hanging method for a trim cover of a vehicle seat, the vehicle seat including a cushion pad having a central part and bank faces developed rightwardly and leftwardly of the central part, the method being configured to inwardly hang the trim cover along boundaries between the central part and the bank faces of the cushion pad, respectively, the method comprising:

cutting out multiple workpieces to be formed into the trim cover;

applying gathers to portions of the cut out workpieces, the gathered portions corresponding to lateral inward hanging ends located at lateral end portions of inward hanging margins of the cut out workpieces for lateral inward hanging;

sewing up the cut out workpieces subjected to the gathering, in a manner to curve, into inward hanging directions, the inward hanging margin portions of the workpieces subjected to the gathering by contraction of obverse surface materials of the workpieces by virtue of the gathering, to thereby form the trim cover;

mounting inward hanging members to sewing edges of the trim cover; and, performing inward hanging by covering the sewn trim cover into longitudinal inward hanging grooves formed along boundaries between the central part and the bank faces of the cushion pad, and by engagingly attaching engagement fasteners into and/or between the inward hanging members mounted to the sewing edges of the trim cover and engagement members formed at a cushion pad side or at a frame side on which the cushion pad is placed, to thereby inwardly hang the trim cover.

2. The inward hanging method of claim 1, wherein the inward hanging grooves comprise lateral and longitudinal inward hanging grooves, wherein the central part of the cushion pad is formed with the lateral inward hanging grooves for lateral inward hanging in the lateral direction, wherein the lateral inward hanging grooves are intersected with the longitudinal inward hanging grooves and are connected to the longitudinal inward hanging grooves, respectively, for the inward hanging, and wherein the performing of inward hanging comprises conducting inward hanging into the inward hanging grooves for lateral inward hanging by engagingly attaching the engagement fasteners into and/or between the engagement members formed at the cushion pad side or at the frame side on which the cushion pad is placed.

3. The inward hanging method of claim 1, wherein the applying of gathers to portions of the cut out workpieces comprises applying a gathering length to the sewing portion of each pertinent workpiece that is made to be the same as a gathering length applied to a mated stitching portion of another workpiece which is to be stitched to the pertinent workpiece.

4. An inward hanging method for a trim cover of a vehicle seat, the vehicle seat including a cushion pad having a central part and bank faces rightward and leftward of the central part, the method being configured to inwardly hang the trim cover along boundaries between the central part and the bank faces of the cushion pad, the method comprising:

cutting out multiple workpieces to be formed into the trim cover;

gathering portions of the cut out workpieces to form gathers, the gathered portions corresponding to lateral inward hanging ends located at lateral end portions of inward hanging margins of the cut out workpieces;

sewing the gathered portions so as to curve the cut out workpieces into inward hanging directions and to contract obverse surfaces of the cut out workpieces to thereby form the trim cover;

mounting inward hanging members to sewing edges of the trim cover;

inserting the inward hanging members into longitudinal inward hanging grooves formed along boundaries between the central part and the bank faces of the cushion pad; and, attaching engagement fasteners into and/or between the inward hanging members mounted to the sewing edges of the trim cover and engagement members formed at a cushion pad side or at a frame side on which the cushion pad is placed, to thereby inwardly hang the trim cover.

5. The inward hanging method of claim 4, wherein the inward hanging grooves comprise lateral and longitudinal inward hanging grooves, wherein the central part of the cushion pad is formed with the lateral inward hanging grooves for lateral inward hanging in the lateral direction, wherein the lateral inward hanging grooves are intersected with the longitudinal inward hanging grooves and are connected to the longitudinal inward hanging grooves, respectively, for the inward hanging, and wherein the performing of inward hanging comprises conducting inward hanging into the inward hanging grooves for lateral inward hanging by engagingly attaching the engagement fasteners into and/or between the engagement members formed at the cushion pad side or at the frame side on which the cushion pad is placed.

6. A vehicle seat comprising:

a cushion pad having a central part, a first bank face positioned along a first side of the central part, and a second bank face positioned along a second side of the central part opposite the first side, wherein a first boundary is defined between the central part and the first bank face and a second boundary is defined between the central part and the second bank face;

a trim cover comprising a workpiece including an inward hanging margin having a gathered lateral end portion, the inward hanging margin forming a curve in an inward hanging direction of the trim cover;

one or more inward hanging members mounted to the trim cover and positioned within one of the first boundary and the second boundary; and, one or more fasteners engaging into and/or between the one or more inward hanging members mounted to the trim cover and engagement members formed at a cushion pad side or at a frame side on which the cushion pad is placed.

* * * * *